US012648014B2

(12) United States Patent
Chopade et al.

(10) Patent No.: US 12,648,014 B2
(45) Date of Patent: Jun. 2, 2026

(54) WIRELESS SIGNAL MONITORING AND PRIORITY CONNECTION CONTROL

(71) Applicant: Charter Communications Operating, LLC, St. Louis, MO (US)

(72) Inventors: Vishal G. Chopade, Castle Pines, CO (US); Mohamed Daoud, Englewood, CO (US); Hany A. Heikal, Aurora, CO (US); Hossam H. Hmimy, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 289 days.

(21) Appl. No.: 18/370,608

(22) Filed: Sep. 20, 2023

(65) Prior Publication Data

US 2025/0097972 A1 Mar. 20, 2025

(51) Int. Cl.
| | |
|---|---|
| *H04W 72/566* | (2023.01) |
| *H04W 24/08* | (2009.01) |
| *H04W 28/02* | (2009.01) |
| *H04W 72/12* | (2023.01) |

(52) U.S. Cl.
CPC ......... *H04W 72/566* (2023.01); *H04W 24/08* (2013.01); *H04W 28/0215* (2013.01); *H04W 72/12* (2013.01)

(58) Field of Classification Search
None
See application file for complete search history.

(56) References Cited

U.S. PATENT DOCUMENTS

| | | | | |
|---|---|---|---|---|
| 2014/0348096 A1* | 11/2014 | Nagata | ................. | H04B 7/0632 370/329 |
| 2015/0116447 A1* | 4/2015 | Kobayashi | .............. | H04W 8/22 348/14.02 |

* cited by examiner

*Primary Examiner* — Anh Ngoc M Nguyen
(74) *Attorney, Agent, or Firm* — Armis IP Law, LLC

(57) ABSTRACT

A wireless system as discussed herein includes a communication management resource configured to control flows of data through a first wireless access point to a remote network. To control the flows of data, the communication management resource receives a schedule indicating a pattern of multiple mobile communication devices associated with a subscriber domain. The schedule may indicate a respective pattern associated with the multiple mobile communication devices. For example, the respective pattern may indicate times when the multiple mobile communication devices are present in the subscriber domain and/or times when the communication devices communicate through the first wireless access point to one or more destination in a remote network. The communication management resource utilizes the schedule to control priority of conveying communications from the multiple mobile communication devices through the first wireless access point to the remote network.

26 Claims, 10 Drawing Sheets

Figure 3:
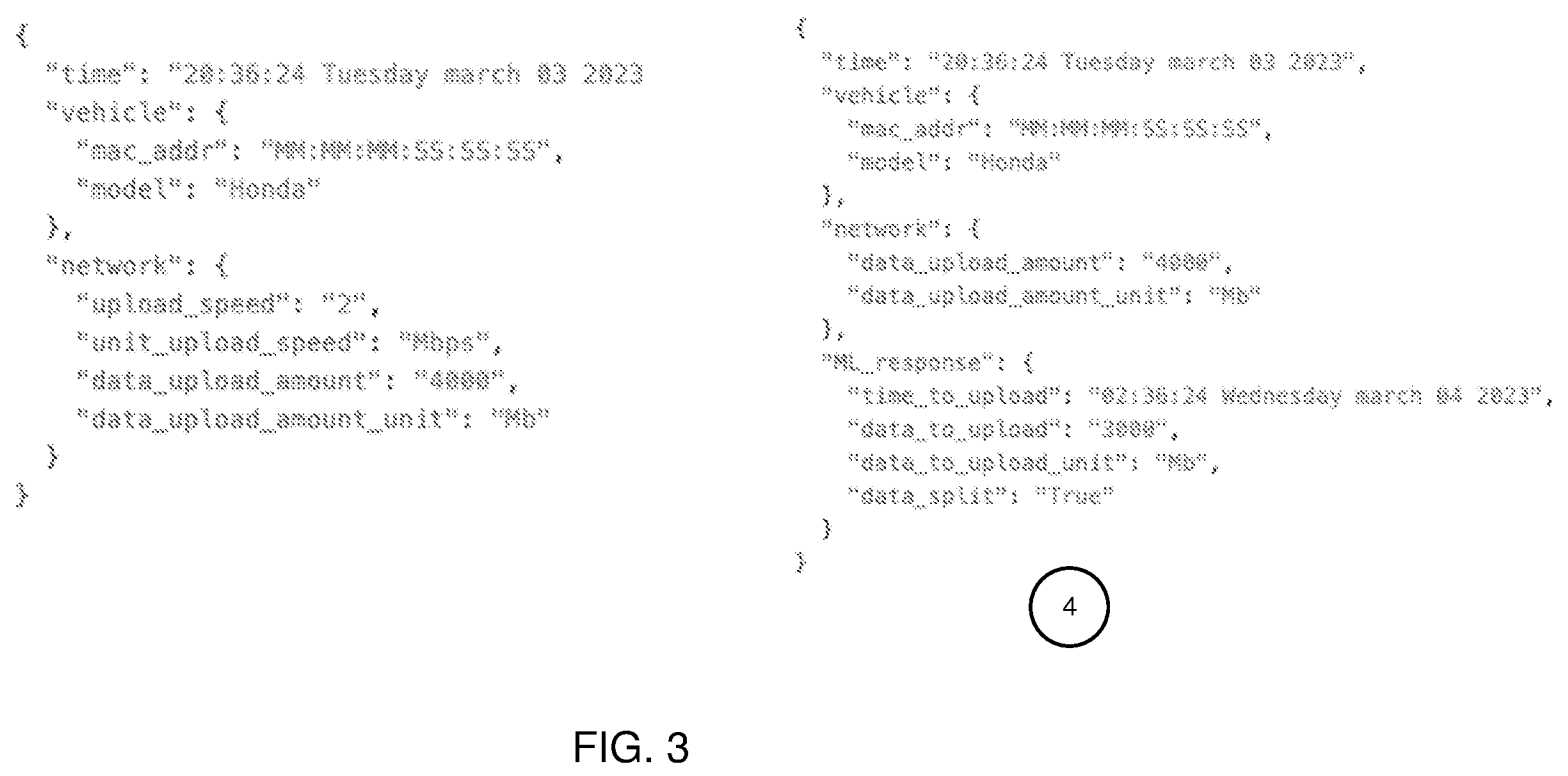

"time": "20:36:24 Tuesday march 03 2023"
"vehicle": {
  "mac_addr": "MM:MM:MM:SS:SS:SS",
  "model": "honda"
},
"network": {
  "upload_speed": "2",
  "unit_upload_speed": "mbps",
  "data_upload_amount": "4000",
  "data_upload_amount_units": "mb"
}

"time": "20:36:24 Tuesday march 03 2023"
"vehicle": {
  "mac_addr": "MM:MM:MM:SS:SS:SS",
  "model": "honda"
},
"network": {
  "data_upload_amount": "4000",
  "data_upload_amount_units": "mb"
},
"ML_response": {
  "time_to_upload": "03:36:24 Wednesday march 04 2023",
  "data_to_upload": "2000",
  "data_to_upload_units": "mb",
  "data_split": "true"
}

| SCHEDULE INFO. 161 | V1 CD 120-1 | V2 CD 120-2 | CD H1 | CD H2 | CD H3 | |
|---|---|---|---|---|---|---|
| SUNDAY | | | | | | |
| MONDAY | D = 6:00AM A = 5:00PM | D = 7:00AM A = 5:00PM | D = 7:00AM A = 5:00PM | D = 6:00AM A = 5:00PM | D = 9:00AM A = 2:00PM | |
| TUESDAY | D = 6:00AM A = 5:00PM | D = 7:00AM A = 5:00PM | D = 7:00AM A = 5:00PM | D = 6:00AM A = 5:00PM | | |
| WEDNESDAY | D = 6:00AM A = 5:00PM | D = 7:00AM A = 5:00PM | D = 7:00AM A = 5:00PM | D = 6:00AM A = 5:00PM | | |
| THURSDAY | D = 6:00AM A = 5:00PM | D = 7:00AM A = 5:00PM | D = 7:00AM A = 5:00PM | D = 6:00AM A = 5:00PM | | |
| FRIDAY | | D = 7:00AM A = 5:00PM | D = 7:00AM A = 5:00PM | | | |
| SATURDAY | | | | | | |

FIG. 6

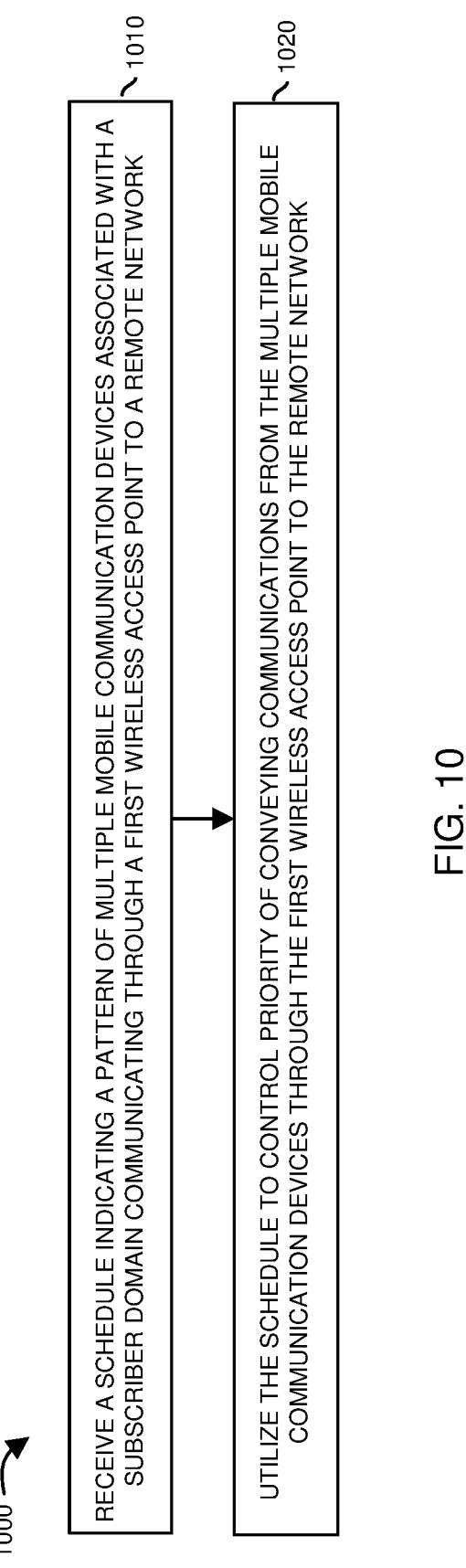

RECEIVE A SCHEDULE INDICATING A PATTERN OF MULTIPLE MOBILE COMMUNICATION DEVICES ASSOCIATED WITH A SUBSCRIBER DOMAIN COMMUNICATING THROUGH A FIRST WIRELESS ACCESS POINT TO A REMOTE NETWORK ⟋ 1010

UTILIZE THE SCHEDULE TO CONTROL PRIORITY OF CONVEYING COMMUNICATIONS FROM THE MULTIPLE MOBILE COMMUNICATION DEVICES THROUGH THE FIRST WIRELESS ACCESS POINT TO THE REMOTE NETWORK ⟋ 1020

WIRELESS SIGNAL MONITORING AND PRIORITY CONNECTION CONTROL

BACKGROUND

The Internet of Things (IoT) revolution and the increased use of electric vehicles as well as use of communication devices in general has led to a surge in household wireless network usage. As data-intensive applications and services continue to grow, wireless network congestion has become a challenge for efficient data flow through a wireless access point (a.k.a., a router). Current wireless access points lack the ability to dynamically manage communication of data based on individual devices' needs, resulting in suboptimal performance.

BRIEF DESCRIPTION OF EMBODIMENTS

To address this issue, techniques herein include novel dynamic traffic management for wireless access points (a.k.a., routers). In one example, a communication management resource as described herein analyzes factors such as the vehicle arrival times, vehicle departure times, available upload capacity, data needs, etc., to prioritize communication device data flow. By reducing congestion and optimizing network performance, techniques herein provide solutions for increased wireless throughput demands associated with data-heavy applications and services.

For example, as discussed herein, a communication management resource can be configured to control flows of data through a first wireless access point to a remote network. The communication management resource receives a schedule indicating a pattern of multiple mobile communication devices associated with a subscriber domain. The schedule and corresponding pattern may be based on the multiple mobile communication devices being present in the subscriber domain and/or communication of respective data payloads through the first wireless access point to one or more destination in a remote networks at different times. The communication management resource utilizes the schedule to control priority of conveying communications from the multiple mobile communication devices through the first wireless access point to the remote network.

In one example, the multiple mobile communication devices include a first mobile communication device and a second mobile communication device. Use of the schedule by the communication management resource includes the communication management resource or other suitable entity adjusting a priority of the first mobile communication device to be higher in priority for transmitting data to a destination network address than the second mobile communication device in response to detecting expected absence of the first mobile communication device from the subscriber domain at a time as indicated by the schedule. More specifically, the schedule may indicate an expected absence of the second mobile communication device at a later time than the absence of the first mobile communication device from the subscriber domain. In such an instance, even though both the first mobile communication device and the second mobile communication device may have data to communicate to a remote network, the expected absence of the first mobile communication device from the subscriber domain at the particular time (such as earlier than the second mobile communication device) results in the first mobile communication device being set to a higher priority level to communicate respective data through the first wireless access point to the remote network.

Yet further, adjustment of the priority of the first mobile communication device to be higher in priority for transmitting data to the destination network address than the second mobile communication device may depend on multiple factors such as: i) a magnitude of first data buffered by the first mobile communication device for delivery to the destination network address, and ii) a magnitude of second data buffered by the second mobile communication device for delivery to the destination network address. In other words, the magnitude of first data may be substantially greater than the magnitude of the second data, resulting in the first mobile communication device being provided the higher priority than the second mobile communication device to communicate respective data through the first wireless access point to the remote network.

Note that the schedule information indicating a history of communications associated with the communication devices can be generated in any suitable manner. For example, the communication management resource or other suitable entity can be configured to produce the schedule information based on monitored connectivity of the multiple mobile communication devices with the first wireless access point. The schedule information can be configured to indicate a history (pattern) of the multiple mobile communication devices wirelessly communicating through the first wireless access point to the remote network.

In accordance with further examples, the communication management resource can be configured to adjust a priority of conveying communications through the first wireless access point to one or more destination network address in the remote network depending on a time in which each of the mobile communication devices and corresponding vehicles is expected to depart from a subscriber domain serviced by the first wireless access point as indicated by the schedule.

Still further, the communication management resource or other suitable entity as discussed herein can be configured to monitor wireless connectivity of the multiple mobile communication devices with the first wireless access point. The monitored wireless connectivity may further indicate different times when corresponding vehicles associated with the multiple mobile communication devices are present in the subscriber domain. Accordingly, via the detected pattern of prior wireless connectivity, the communication management resource uses the monitored wireless connectivity to determine arrival and departures of the mobile communication devices from the subscriber domain. Based on such information, the communication management resource derives the schedule information. Additionally, the multiple mobile communication devices include any number of communication devices. For example, the multiple mobile communication devices may include: i) a first mobile communication device operative to communicate first buffered data associated with a first vehicle to the destination network address in the remote network, ii) a second mobile communication device operative to communicate second buffered data associated with a second vehicle to the destination network address in the remote network, and so on.

As previously discussed, the schedule information as discussed herein can be used as a basis to control priority of communications from the multiple mobile communication devices through the first wireless access point to the remote network. This can include, via use of the schedule information, controlling the priority of communications from the multiple mobile communication devices through the first wireless access point based on an anticipated time in which the multiple mobile communication devices are expected to depart from the subscriber domain serviced by the first wireless access point.

In yet a further example, the communication management resource can be configured to control conveyance of a first communication received from a first mobile communication device through the first wireless access point to a destination network address. The first communication can be configured to include any suitable information such as first data specifying a unique identity of a first vehicle associated with the first communication device and corresponding magnitude of first buffered data for transmission to the destination mobile communication device. The communication management resource can be configured to control conveyance of a second communication received from the destination network address through the first wireless access point to the first mobile communication device. The second communication can be configured to include data specifying a time at which to communicate the first buffered data from the first mobile communication device through the first wireless access point to the destination network address.

In accordance with still further examples as discussed herein, via the schedule as discussed herein, the communication management resource can be configured to control the priority of conveying the communications from the multiple mobile communication devices through the first wireless access point to the remote network based on anticipated presence of the multiple mobile communication devices in the subscriber domain as indicated by the schedule.

Techniques as discussed herein are useful over conventional techniques. For example, one or more implementation of a communication management resource and corresponding operations as discussed herein provide better use of a respective wireless network to more efficiently convey data.

Note that any of the resources as discussed herein can include one or more computerized devices, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium or any computer readable hardware storage medium on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by the computer processor hardware, cause the computer processor hardware (such as one or more co-located or disparately processor devices or hardware) to: receive a schedule indicating a pattern of multiple mobile communication devices associated with a subscriber domain communicating through a first wireless access point to a remote network; and utilize the schedule to control priority of conveying communications from the multiple mobile communication devices through the first wireless access point to the remote network.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing wireless connectivity in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a summary of embodiments) and corresponding figures of the present disclosure as further discussed below.

BRIEF DESCRIPTION OF THE DRAWINGS

FIG. 3A is an example diagram illustrating code supporting communication of data from a first vehicle through a respective wireless access point to a remote management entity as discussed herein.

FIG. 3B is an example diagram illustrating code supporting communication of data from a management entity through a respective wireless access point to a second vehicle as discussed herein.

FIG. 6 is an example diagram illustrating schedule information indicating a history of the communication devices being present in the subscriber domain as discussed herein.

FIG. 10 is an example diagram illustrating a method as discussed herein.

Figure 1:
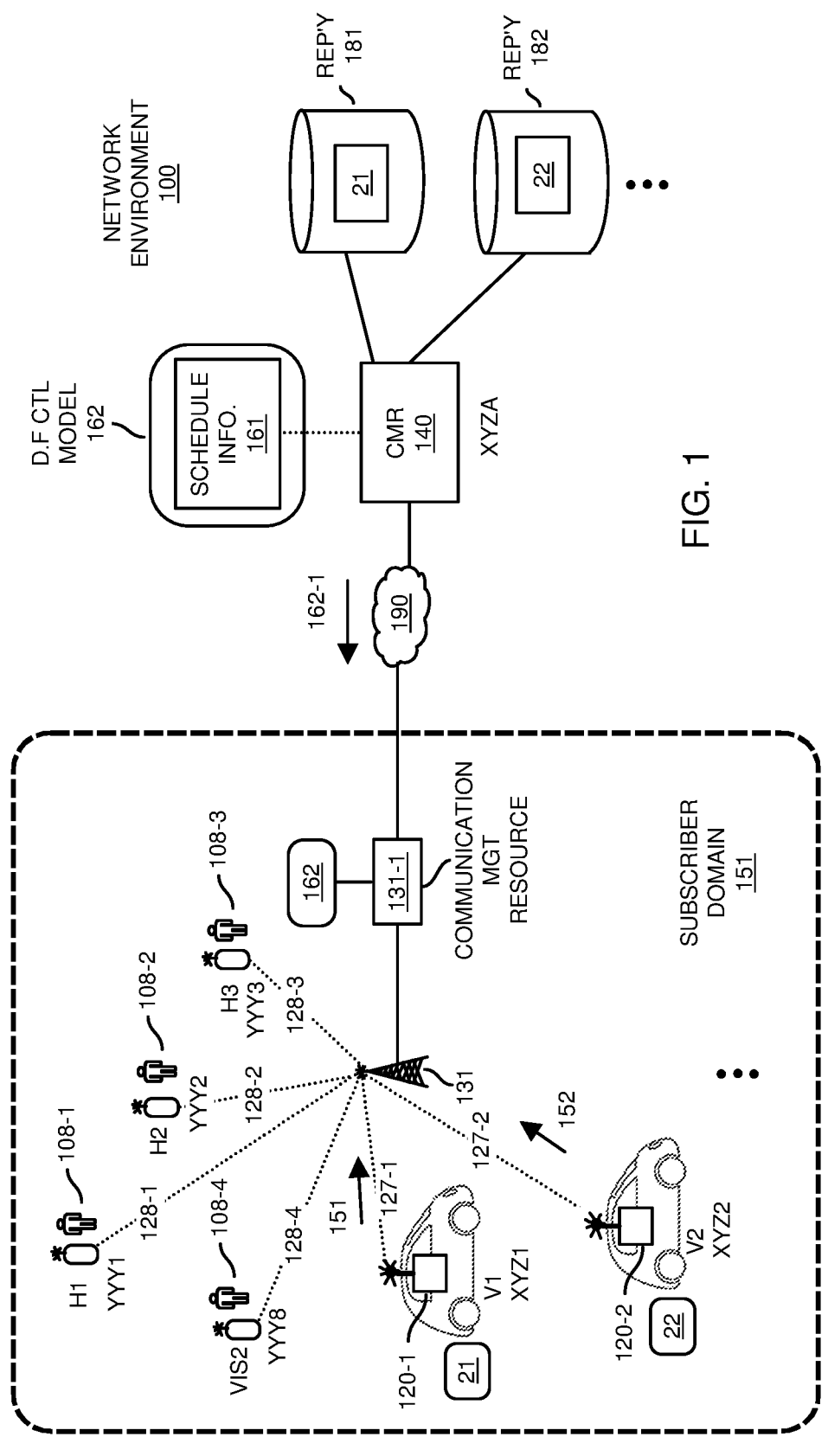
FIG. 1 is an example diagram illustrating a network environment and implementation of one or more wireless access points in a subscriber domain to provide multiple different communication devices connectivity to a remote network as discussed herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

Techniques as discussed herein include logic designed to be implemented in routers that dynamically control data flow for cars (a.k.a., vehicles) based on various factors such as vehicle arrival times, vehicle departure times, individual vehicle upload capacity, individual vehicle data that needs to be uploaded, primary SSID traffic to be transmitted through a respective wireless access point, secondary SSID traffic to be transmitted through a respective wireless access point, etc. The logic as discussed herein can be configured to analyze these factors and produce a respective schedule that is eventually used to make decisions on when to prioritize data upload from specific devices over others to reduce network congestion.

FIG. 1 is an example diagram illustrating a network environment and implementation of one or more wireless access points in a subscriber domain to provide multiple different communication devices connectivity to a remote network as discussed herein.

As shown in FIG. 1, the network environment 100 includes wireless access point 131 (a.k.a., a wireless base station, wireless station, communication device, etc.), communication device H1, communication device H2, communication device H3, communication device VIS2, communication device 120-1, communication device 120-2, vehicle V1, vehicle V2, network 190, communication management resource 131-1, communication management resource 140, repository 181, and repository 182.

In this example, the communication device H1 is operated by the user 108-1, communication device H2 is operated by the user 108-2, communication device H3 is operated by the user 108-3, communication device VIS2 is operated by the user 108-4, communication device 120-1 resides in vehicle V1, communication device 120-2 resides in vehicle V2, and so on.

Via communications over the respective wireless communication links, the wireless access point 131 receives communications from each of the communication devices in the subscriber domain 151.

For example, the wireless communication link 128-1 provides wireless connectivity between the communication device H1 and the wireless access point 131; the wireless communication link 128-2 provides wireless connectivity between the communication device H2 and the wireless access point 131; the wireless communication link 128-3 provides wireless connectivity between the communication device H3 and the wireless access point 131; the wireless communication link 128-3 provides wireless connectivity between the communication device H3 and the wireless access point 131; the wireless communication link 128-4 provides wireless connectivity between the communication device VIS2 and the wireless access point 131; the wireless communication link 127-1 provides wireless connectivity between the communication device 120-1 and the wireless access point 131; the wireless communication link 127-2 provides wireless connectivity between the communication device 120-2 and the wireless access point 131; and so on.

In general, the wireless access point 131 receives communications (data) from the communication devices over respective wireless communication links and forwards such data over the network 190 to respective target entities in the network environment 100.

Each of the communication devices in the subscriber domain 151 competes for use of wireless services provided by the wireless access point 131 to communicate through the wireless access point 131 with the remote network 190 and corresponding one or more target entities to which the communication devices transmit data.

Note further that each of the communication devices in the subscriber domain 151 includes a respective unique identifier value assigned to it. For example, the communication device 120-1 integrated into the vehicle V1 is assigned the network address XYZ1; the communication device 120-to integrated into the vehicle V2 is assigned the network address XYZ2; the communication device H1 is assigned the network address YYY1; the communication device H2 is assigned the network address YYY2; the communication device H3 is assigned the network address YYY3; the communication device VIS2 is assigned the network address YYY8; and so on.

Each of the communications transmitted from the communication devices includes a respective source network address indicating the corresponding communication device transmitting the communications as well as a respective target destination address indicating to which of multiple communication devices in the network environment 100 the communications are targeted. Via the source network address, the wireless access point 131 is able to identify which of the corresponding communication devices is transmitting the communications. Via the destination network address information and corresponding communications from the communication devices, the wireless access point is able to identify which of the corresponding possible destination communication devices in the network the corresponding communications are being transmitted.

In a similar manner, in a reverse direction, the wireless access point 131 is able to identify communication devices in the network environment 100 transmitting the communications as well as which of the communication devices in the subscriber domain 151 to which the received communications from remote network 190 are targeted for delivery.

Note that each of the components/resources in network environment 100 can be implemented in any suitable manner. For example, wireless access point 131 can be implemented as wireless access point hardware, wireless access point software, or a combination of wireless access point hardware and wireless access point software; communication device 120-1 can be implemented as communication device hardware, communication device software, or a combination of communication device hardware and communication device software; communication device 120-2 can be implemented as communication device hardware, communication device software, or a combination of communication device hardware and communication device software; communication device H1 can be implemented as communication device hardware, communication device software, or a combination of communication device hardware and communication device software; communication device H2 can be implemented as communication device hardware, communication device software, or a combination of communication device hardware and communication device software; communication management resource 131-1 can be implemented as communication management hardware, communication management software, or a combination of communication manager hardware and communication management software; communication management resource 140 can be implemented as communication management hardware, communication management software, or a combination of communication manager hardware and communication management software; and so on.

Note further that the communication management resources as discussed herein can be co-located and/or disparately located with respect to each other.

In this example, the vehicle V1 generates the vehicle data 21; the vehicle V2 generates the vehicle data 22; and so on.

Assume that the vehicle data (vehicle data 21 and vehicle data 22) generated by each of the vehicles V1 and V2 is significant such as more or less than 2.5 GB (gigabytes) of data per hour. However, before this data is uploaded through the wireless access point 131 (or other wireless access point in the network environment 100) to a database and stored in a repository at the communication management resource 140 for further analysis, some data may be filtered out.

Assume that the usage of wireless services and wireless access point 131 by the communication devices such as other than the communication device 120-1 and the communication device 120-2 in the subscriber domain 151 is at its highest from 5 μm to 11 pm every day. Monitoring usage of the wireless access point 131 and corresponding provided wireless services as described herein provides valuable insight that can be utilized to identify optimal times for uploading high and low priority data, which can be categorized based on the manufacturer of the cars. By processing the potentially high amount of data (such as including vehicle data 21 and vehicle data 22) communicated through the first wireless access point 131 at different times for multiple sample days, and generation of the corresponding schedule information 161 indicating a respective historical patterns of the communication devices using wireless services associated with the wireless access point 131, the communication management resources as discussed herein identify specific time intervals during different days of the week in which the upload of high and low priority data can be managed effectively, while minimizing occurrence of network congestion.

The approaches of monitoring network usage by the communication devices in generation of schedule information as described herein helps to mitigate the potential impact of the increasing amount of data generated by vehicles (such as vehicle VEH1 and vehicle VEH2) and ensures efficient use of available network resources such as wireless access point 131 and corresponding wireless channels used by the wireless access point 131 and communication devices to convey data.

It is further noted that the use of the wireless access point 131 in the subscriber domain 151 may be at its lowest between 12 o'clock midnight and 7 o'clock in the morning. The highest usage of the wireless access point 131 may occur between 5 o'clock p.m. and 12 o'clock midnight.

The proposed logic as discussed herein such as communication management resources and/or data flow control model 162 (including schedule information 161 indicating a respective history of use associated with the wireless access point 131) can be configured to control conveyance of subsequent communications through the wireless access point 131 based on one or more factors such as vehicle arrival times into the subscriber domain 151, vehicle departure times out of the subscriber domain 151, individual upload capacity of each communication device and amount of vehicle data to be uploaded to the communication management resource 140, individual data needs to be uploaded by each communication device through the wireless access point 131, primary SSID traffic, and secondary SSID traffic. The logic as discussed herein can be configured to receive input data from the wireless access point 131 (such as a router) and send it to the communication management resource 140 or other suitable entity for machine learning and processing.

Figures 2A, 2B:
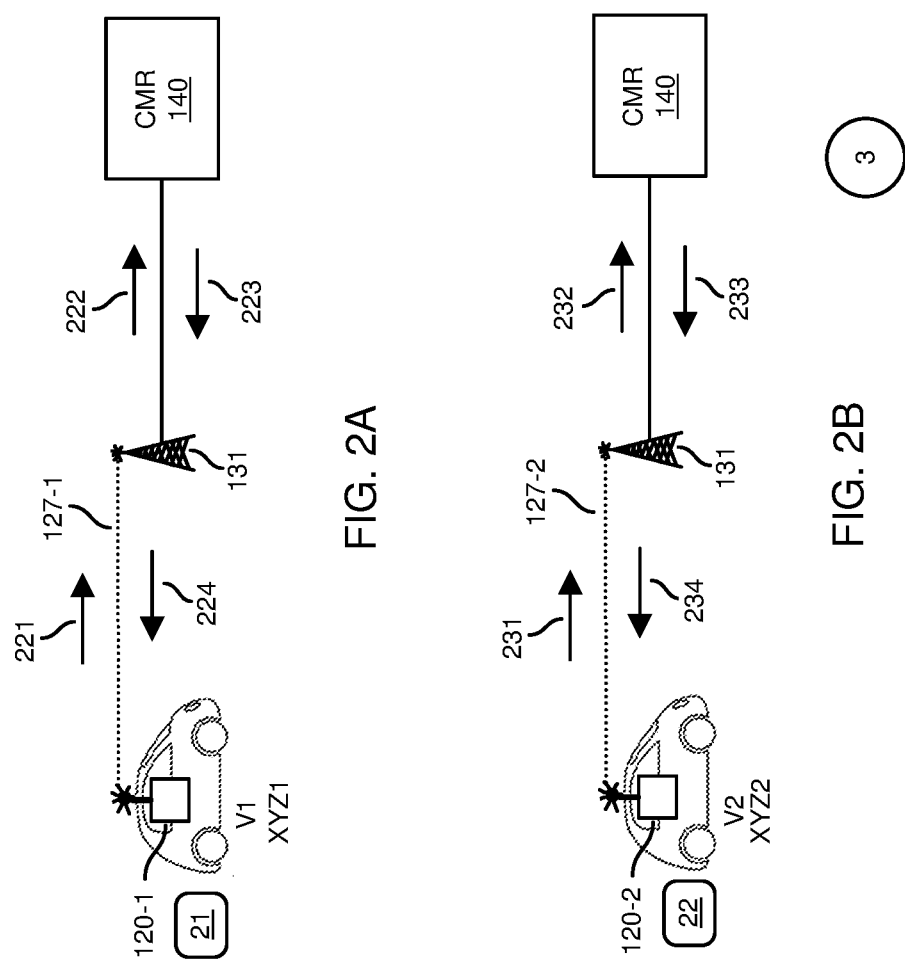
FIGS. 2A and 2B are example diagrams illustrating communications between multiple vehicles and a corresponding communication management resource as discussed herein.

FIG. 2A is an example diagram illustrating communications between a first vehicle and a remote communication management resource as discussed herein.

To upload corresponding data 21 associated with the vehicle V1, the vehicle V1 establishes a respective wireless communication link 127-1 with the wireless access point 131. Via the communication of data 221 from the vehicle V1 (such as in accordance with the form of JSON format—JavaScript Object Notation—of communicating data as shown in FIG. 3A) and corresponding communication device 120-1, the communication device 120-1 communicates respective data 21 associated with the vehicle V1 to the wireless access point 131 over the wireless communication link 127-1.

In general, note that JSON is an open standard file format and data interchange format that uses human-readable text to store and transmit data objects consisting of attribute-value pairs and arrays. It is a common data format with diverse uses in electronic data interchange, including that of web applications with servers.

Via communications 222, the wireless access point 131 forwards the respective data 21 received from the vehicle V1 to the communication management resource 140. The communication management resource 140 then processes the corresponding received vehicle data associated with vehicle V1. Such uplink communications allow the wireless access point 131 to collect relevant data from the vehicle V1 and forward it to the communication management resource 140 for processing.

As further shown, in the downlink direction, the communication management resource 140 communicates a response (communications 223) associated with the previously received vehicle data 21. The wireless access point 131 further wirelessly transmits the response via communications 224 (such as in accordance with the form of JSON code of communicating data as shown in FIG. 3B) to the communication device 120-1 associated with the vehicle V1.

This completes the round-trip process of the communication device 120-1 communicating vehicle data 21 in an uplink direction to and through the wireless access point 131 to the communication management resource 140 and the communication management resource 140 communicating a respective response to and through the wireless access point 131 to the communication device 120-1 associated with the vehicle V1.

As further discussed below in FIG. 2B, the communication device 120-2 associated with the vehicle V2 and the communication management resource communicate with each other through the wireless access point 131.

FIG. 2B is an example diagram illustrating communications between a second vehicle and a remote communication management resource as discussed herein.

To upload corresponding data associated with the vehicle V2, the vehicle V2 establishes a respective wireless communication link 127-2 with the wireless access point 131. Via the communication of data 231 from the vehicle V2 (such as in accordance with the form of JSON format—JavaScript Object Notation—of communicating data as shown in FIG. 3A) and corresponding communication device 120-2, the communication device 120-2 communicates respective data 22 associated with the vehicle V2 to the wireless access point 131 over the wireless communication link 127-2.

Via communications 232, the wireless access point 131 forwards the respective data 22 received from the vehicle V2 to the communication management resource 140. The communication management resource 140 then processes the corresponding received vehicle data 22 associated with vehicle V2. Such uplink communications allow the wireless access point 131 to collect relevant data from the vehicle V2 and forward it to the communication management resource 140 for processing.

As further shown, in the downlink direction, the communication management resource 140 communicates a response (in communications 233) associated with the previously received vehicle data 22 to the wireless access point 131. The wireless access point 131 further wirelessly transmits the response via communications 234 (such as in accordance with the form of JSON code of communicating data as shown in FIG. 3B) to the communication device 120-2 associated with the vehicle V2.

This completes the round-trip process of the communication device 120-2 communicating vehicle data 22 in an uplink direction to and through the wireless access point 131 to the communication management resource 140 and the communication management resource 140 communicating a respective response to and through the wireless access point 131 to the communication device 120-2 associated with the vehicle V2.

Thus, as shown in FIG. 2A in FIG. 2B, each of the vehicles establishes communication with the access point, providing relevant data in JSON or other suitable format.

The wireless access point 131 collects and transmits the vehicle's data to the cloud compute (a.k.a., communication management resource 140) for further processing. The collected vehicle data 21 and vehicle data 22 are analyzed using a machine learning model in the cloud compute (such as implemented by the communication management resource 140 or other suitable entity).

Certain actions as described herein include data traffic prioritization. For example, based on the machine learning output (such as data flow control model 162 and corresponding schedule information 161), the communication management resource 140 and/or communication management resource 131-1 prioritizes data flows, determining when and how to upload data from each of the vehicles with respect to other communication devices using wireless services provided by the wireless access point 131.

The resulting benefit of providing data flow control via the data flow control model 162 and/or schedule information 161 as discussed herein is reduced network congestion.

More specifically, by dynamically controlling data flows over the respective wireless communication links in the subscriber domain 151, the logic associated with the communication management resource 140 and/or the communication management resource 131-1 ensures efficient network usage, reducing congestion and optimizing overall network performance of the wireless access point 131 providing wireless services to the communication devices in the subscriber domain 151.

In one example, the logic implemented by the communication management resource 140 and/or communication management resource 131-1, using schedule information 161, the communication management resources intelligently manage data uploads from the communication devices through the wireless access point 131 to the network 190. More specifically, the communication management resources control a respective data flows give priority of using wireless services provided by the wireless access point 131 to household devices (communication device H1, communication device H2, communication device H3, etc., over wireless connectivity services provided to the communication devices 120-1, communication device 120-2, etc.), during peak or other wireless network usage times. In other words, the communication management resource 131-1 and corresponding wireless access point 131 can be configured to provide highest priority wireless services to the user-operated communication devices in the subscriber domain 151. In general, the vehicle data 21 and vehicle data 22 generated by the respective vehicles the one and V2 can be transmitted during times when there is extra wireless bandwidth available to support wireless communication of the vehicle data from a respective vehicle to and through the wireless access point 131 to the target entity such as communication management resource 140 assigned network address XYZA.

Further, the communication management resources as described herein provide real-time decision-making which the communication management resources continuously monitor the wireless network and communication devices, making real-time decisions to accommodate varying data needs and upload capacities. Yet further, examples herein provide enhanced user experience the augmentation of efficient traffic management in which users experience smoother data transfers and improved connectivity for IoT (Internet of Things) devices and connected cars.

Figure 4:
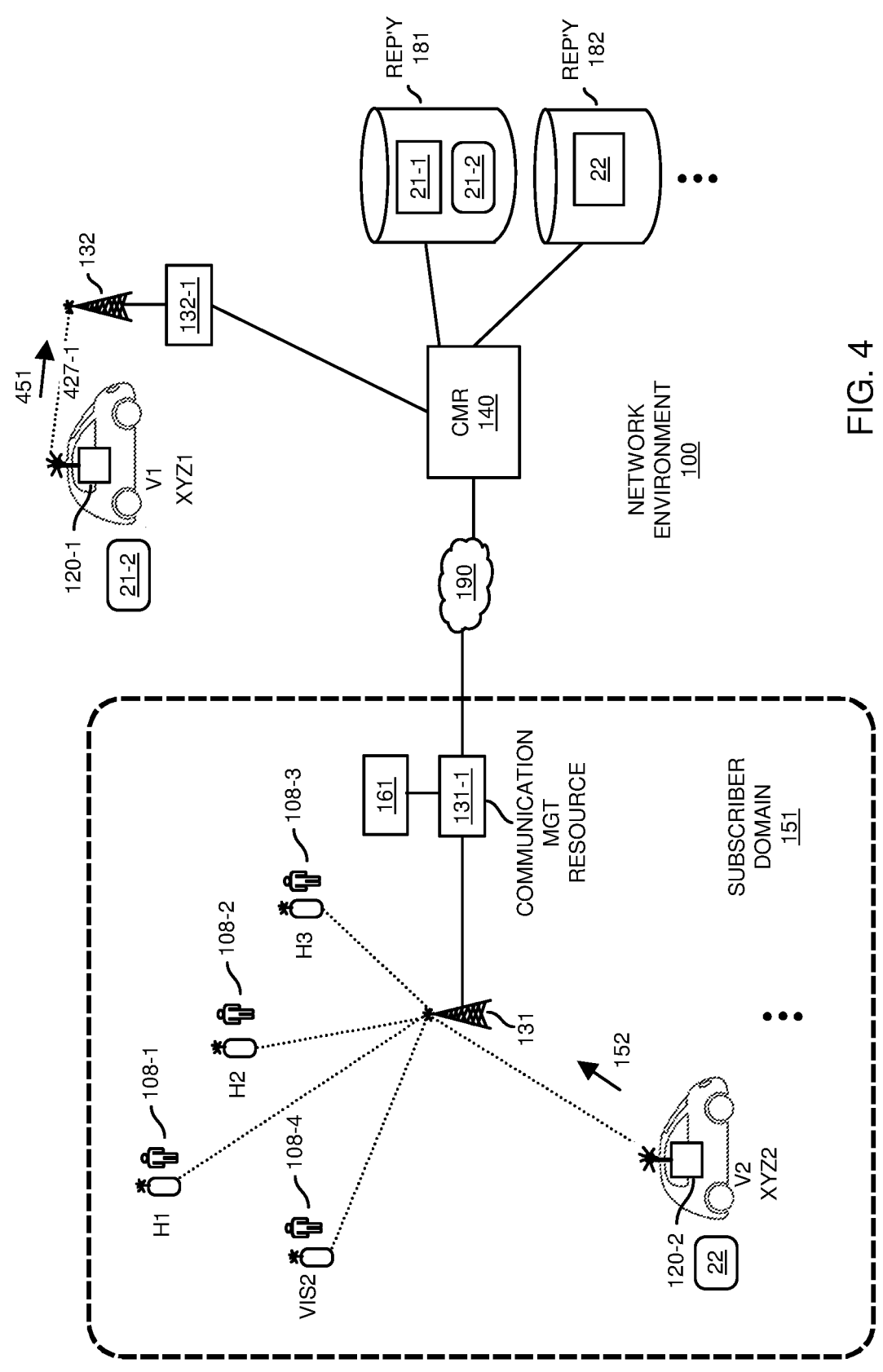
FIG. 4 is an example diagram illustrating communication of data from a respective vehicle through a wireless access point disposed outside of a subscriber domain as discussed herein.

FIG. 4 is an example diagram illustrating communication of data from a respective vehicle through a wireless access point disposed outside of a subscriber domain as discussed herein.

As discussed herein, the machine learning algorithm such as associated with the communication management resource 140 can be configured to analyze the input data to determine the best course of action to reduce network congestion for future uploads of vehicle data.

For example, before the multiple vehicles V1 and V2 in a respective subscriber domain 151 are provided permission to use wireless resources, the communication management resource 140 analyzes the vehicle data received from each of the vehicles V1 and V2 over a time duration such as a few weeks or other suitable amount to determine suitable times in which to allow subsequent uploads of the vehicle data 21 and 22 from the vehicles through the wireless access point 131 to the repositories depending on the arrival time of each of the vehicles V1 and V2 into the subscriber domain 151, departure times of the vehicles V1 and V2 departing from the subscriber domain 151, individual upload capacity associated with each of the vehicles V1 and V2, a magnitude of the amount of vehicle data 21 and a magnitude of vehicle data 22 to be uploaded from respective vehicles V1 and V2 through the wireless access point 131 to the communication management resource 140, primary SSID traffic, and secondary SSID traffic.

Further, as previously discussed, the communication management resources as described herein can be configured to generate the data flow control model 162 and/or corresponding schedule information 161 to prioritize household communication devices over automobile communication devices when uploading respective vehicle data. Additionally, the data flow control model 162 and corresponding schedule information 161 as described herein can be used to indicate when to provide priority of communicating respective vehicle data 21 and vehicle data 22 at different times depending upon one or more factors such as arrival time of the vehicle V1 and arrival time of vehicle V2 into the subscriber domain 151 and/or departure time of vehicle be one and departure time of vehicle V2 from the subscriber domain.

Note further that the proposed logic as described herein can be configured to analyze data received from multiple different routers (wireless access points) within the area covered by a specific car's unique MAC address (network address). This provides a better insight into the customer's behavior of using the corresponding vehicles, allowing better management of the uploads and downloads of the vehicle.

More specifically, as previously discussed with respect to FIG. 1, the vehicle V1 can be configured to communicate a first portion of the vehicle data 21 such as vehicle data 21-1 through the wireless access point 131 over a network to the communication management resource 140 for storage in repository 181. In the middle of a respective upload of the corresponding vehicle data 21, the vehicle V1 may depart from the subscriber domain 151 outside of the corresponding region of wireless coverage provided by the wireless access point 131. In such an instance, only a portion of the corresponding vehicle data 21 is uploaded over the wireless communication link 127-1 via communications 151 through the wireless access point 131 to the communication management resource. While traveling, the moving vehicle V1 may or may not connect with a respective wireless access point to continue to upload any remaining portion of the vehicle data 21 to the communication management resource 140 for storage in a respective repository 181.

As shown in FIG. 4, when the vehicle V1 is outside of the region of wireless coverage provided by the wireless access point 131, the vehicle V1 and corresponding communication device 120-1 can be configured to establish wireless connectivity for and 27-1 with another wireless access point 132 in order to continue a respective upload a corresponding vehicle data 21. For example, as shown in FIG. 4, the vehicle V1 and corresponding communication device 120-1 establish wireless communication link 427-1 between the communication device 120-1 and the wireless access point 132. Via further wireless communications 451 over the wireless commute station link from the communication device 120-1 to the wireless access point 132, the communication device 120-1 communicates the remaining portion of the vehicle data 21-2 to the wireless access point 132. The wireless access point 132 further communicates the vehicle data 21-2 over the network 190 to the communication management resource 140 for storage in the repository 181.

Accordingly, examples herein include split upload of corresponding vehicle data depending upon a respective location in which the vehicle V1 and corresponding communication device 120-1 reside.

Note further that the network address XYZ1 assigned to the corresponding communication device 120-1 and corresponding vehicle may be a respective MAC address in a default format in which the first six digits of the respective MAC network address indicate the communication device 120-1 manufacturer's identity, while the last six digits represent the unique identity of the communication devices.

The proposed logic as discussed herein helps to reduce network congestion and improve overall network efficiency, especially when dealing with data-intensive applications like car uploads.

Figure 5:
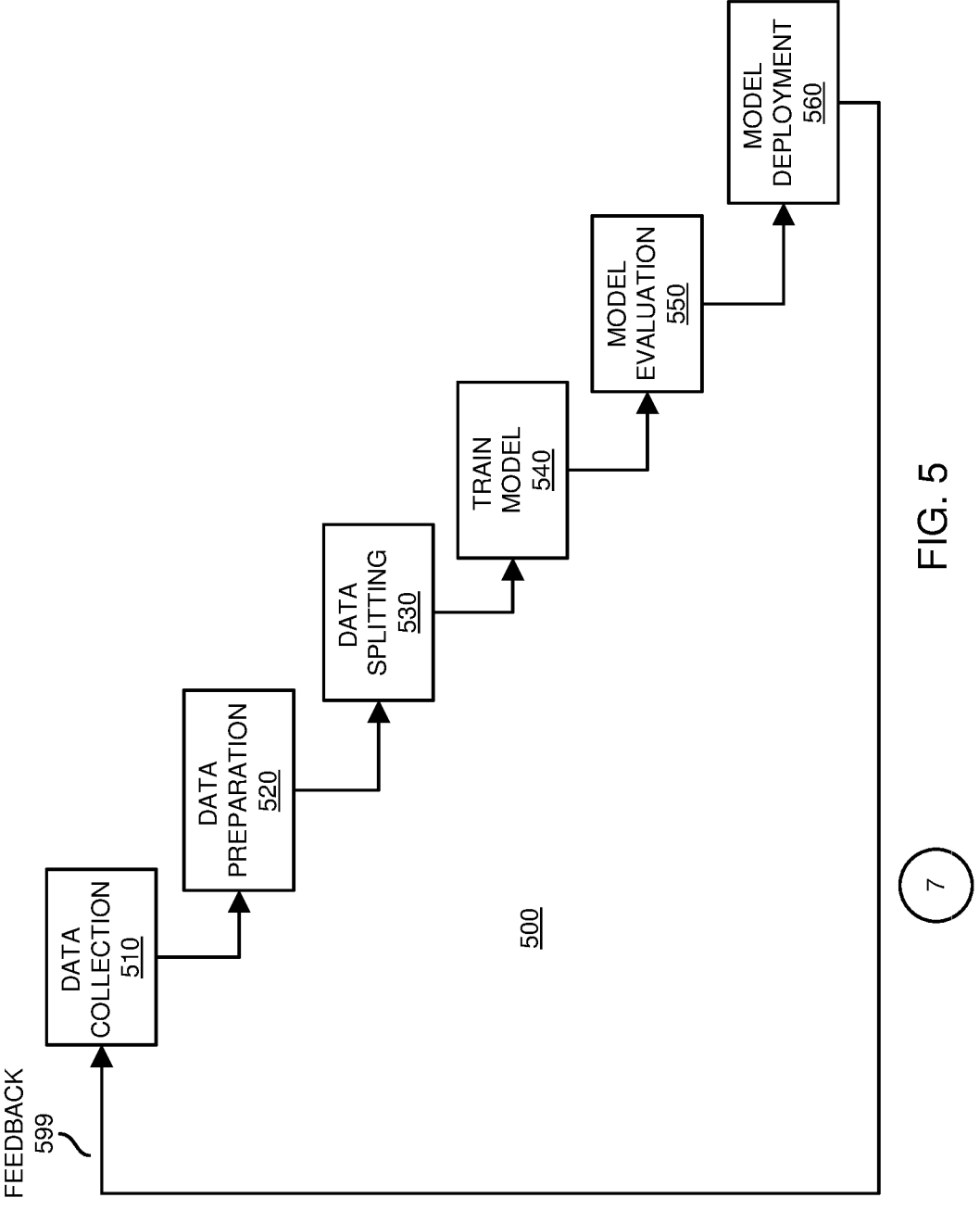
FIG. 5 is an example diagram illustrating proposed management logic such as implementing a machine learning process to creating a respective model or managing control of traffic through the wireless access point as discussed herein.

FIG. 5 is an example diagram illustrating a proposed logic such as the machine learning process to creating a respective model (such as schedule information) for managing control of traffic through the wireless access point as discussed herein.

In this example, the logic created with the machine learning process includes a series of functions as shown in flowchart 500 that begin with the data collection function 510. For example, as its name suggests, the data collection function 510 receives corresponding vehicle data associated with each of the vehicles V1 and V2 during sample time durations as previously discussed.

As its name to suggests, the data preparation function 520 such as via the wireless access point 131 or other suitable entity prepares the received vehicle data for further processing.

Note that the collecting function 510 and the data preparation function 520 of collecting and preprocessing the vehicle data can occur in any suitable location such as at the wireless access point 131 and/or communication management resource 131-1. In one example, the data collection function 510 and the data preparation function 520 require the wireless access point and corresponding controller 131-1 to collect vehicle data based on individual devices' arrival and departure times, upload capacity, and data needs. Once the data is collected, it is preprocessed to ensure that it is in a suitable format for analysis.

The additional functions such as data splitting function 530, model training function 540, model evaluation function 550, and model deployment function 560 can be executed in any suitable location as well such as via the communication management resource 140 (such as cloud computation).

The next operations include selecting and training a machine learning model on the collected vehicle data. This process may take place using cloud compute, where the machine learning model is trained on the received vehicle data to learn the patterns and relationships between the data features. This step may be useful to ensure that the generated model is accurate and can make predictions that are reliable.

After training the model via the model training function 540, the performance of the data flow control model 162 and corresponding schedule information 161 is evaluated with the model evaluation function 550 using a validation set to ensure that it can accurately predict new data. Note that hyperparameter tuning may be carried out to improve the model's performance, followed by the deployment of the model in a production environment via the model deployment function 560. Note that the deployment can occur using cloud computing to enable the model to make predictions in real-time.

Via feedback 599 and continued analysis of wireless service usage associated with the wireless access point 131 and corresponding behavior associated with the vehicles V1 and V2 and corresponding vehicle data 21 and 22, communication management resource 140 can be configured to repeatedly update the corresponding data flow control model 162 and schedule information 161.

Accordingly, overall, the process of generating the respective data flow control model 162 as described herein may include a careful and systematic approach to ensure that the machine learning model 162 is accurate, reliable, and can make predictions that are useful in managing network traffic efficiently through the wireless access point 131.

FIG. 6 is an example diagram illustrating schedule information indicating a history of the communication devices being present in the subscriber domain as discussed herein.

As previously discussed, the network environment includes one or more communication management resources (such as communication management resource 140, communication management resource 131-1, etc.) that monitor the communications associated with the wireless access point 131 on behalf of the different communication devices (communication device H1, communication device H2, communication device H3, communication device 120-1, communication device 120-2, etc.).

In this example, based on monitoring usage of the wireless access point 131, the communication management resource 140 or other suitable entity determines that the vehicle V1 and corresponding communication device 120-1 typically depart from the subscriber domain 151 at 6:00 AM for each day between Monday and Thursday of a given week. The communication management resource 140 or other suitable entity determines that the vehicle V1 and corresponding communication device 120-1 arrives back at the subscriber domain 151 at 5:00 PM for each day between Monday and Thursday of a given week.

Additionally, based on monitoring usage of the wireless access point 131, the communication management resource 140 or other suitable entity determines that the vehicle V2 and corresponding communication device 120-2 depart from the subscriber domain 151 at 7:00 AM for each day between Monday and Friday of a given week. The communication management resource 140 or other suitable entity determines that the vehicle V2 and corresponding communication device 120-2 arrives back at the subscriber domain 151 at 5:00 PM for each day between Monday and Friday of a given week.

Based on monitoring usage of the wireless access point 131, the communication management resource 140 or other suitable entity determines that the communication device H1 departs from the subscriber domain 151 at 7:00 AM for each day between Monday and Friday of a given week. The communication management resource 140 or other suitable entity determines that the communication device H1 arrives back at the subscriber domain 151 at 5:00 PM for each day between Monday and Friday of a given week.

Based on monitoring usage of the wireless access point 131, the communication management resource 140 or other suitable entity determines that the communication device H2 departs from the subscriber domain 151 at 6:00 AM for each day between Monday and Thursday of a given week. The communication management resource 140 or other suitable entity determines that the communication device H2 arrives back at the subscriber domain 151 at 5:00 PM for each day between Monday and Thursday of a given week.

Based on monitoring usage of the wireless access point 131, the communication management resource 140 or other suitable entity determines that the communication device H3 departs from the subscriber domain 151 at 9:00 AM each Monday of a given week. The communication management resource 140 or other suitable entity determines that the communication device H3 arrives back at the subscriber domain 151 at 2:00 PM each Monday of a given week.

The communication management resource as described herein can be configured to analyze the generated schedule information 161 to determine which of the users in the subscriber domain 151 use respective vehicles V1 and V2. For example, since the vehicle V1 and corresponding communication device H2 operated by the user 108-2 typically depart from the subscriber domain at the same time (such as departing at 6 a.m.) and arrive at the subscriber domain at the same time (such as arriving at 5 p.m.) during different days of the week between Monday and Thursday, the communication management resource assumes that the user 108-2 operates the vehicle V1 such as to go to work or other activity.

Since the vehicle V2 and corresponding communication device H1 operated by the user 108-2 typically depart from the subscriber domain at the same time (such as departing at 7 a.m.) and arrive at the subscriber domain at the same time (such as arriving at 5 p.m.) during different days of the week between Monday and Friday, the communication management resource assumes that the user 108-1 operates the vehicle V2 such as to go to work or other activity. Accordingly, examples herein include one or more communication management resources or other suitable entities monitoring wireless connectivity of the multiple mobile communication devices with the wireless access point 131. The monitored wireless connectivity is used to determine arrival and departures of the mobile communication devices from the subscriber domain. The communication management resource or other suitable entity produces the schedule information 161 and corresponding data flow control model 162 based on a monitored connectivity of the multiple mobile communication devices with the first wireless access point 131 in communications through the wireless access point 131. The schedule information 161 indicates a history of the multiple mobile communication devices wirelessly communicating through the first wireless access point to the remote network.

The departure of the vehicle V1 and V2 and arrival of the vehicles V1 and V2 as well as corresponding communication devices can be detected in any suitable manner. For example, the communication device 120-1 can be configured to provide communications over the wireless communication link 127-1 indicating events such as operation expected time of departure, movement of a respective vehicle out of the subscriber domain 151, user providing input to the vehicle to drive it, termination of the respective wireless communication link providing connectivity between the vehicle and the wireless access point 131, etc. Such conditions can be used to detect departure of the respective vehicle from the subscriber domain 151.

The communication device 120-2 can be configured to provide communications over the wireless communication link 127-2 indicating events such as operation expected time of departure, movement of a respective vehicle out of the subscriber domain 151, user providing input to the vehicle to drive it, termination of the respective wireless communication link providing connectivity between the vehicle and the wireless access point 131, etc. Such conditions can be used to detect departure of the respective vehicle from the subscriber domain 151.

The communication management resource 131-1 can detect arrival of the respective vehicle in the subscriber domain based on one or more events such as the vehicle and corresponding communication device establishing a new wireless communication link between the respective vehicle and the wireless access point 131, receipt of location tracking information from the vehicle indicating its current location newly entering the subscriber domain 151, receipt of a communication from the vehicle indicating that it has been parked in the subscriber domain 151, etc.

Figure 7:
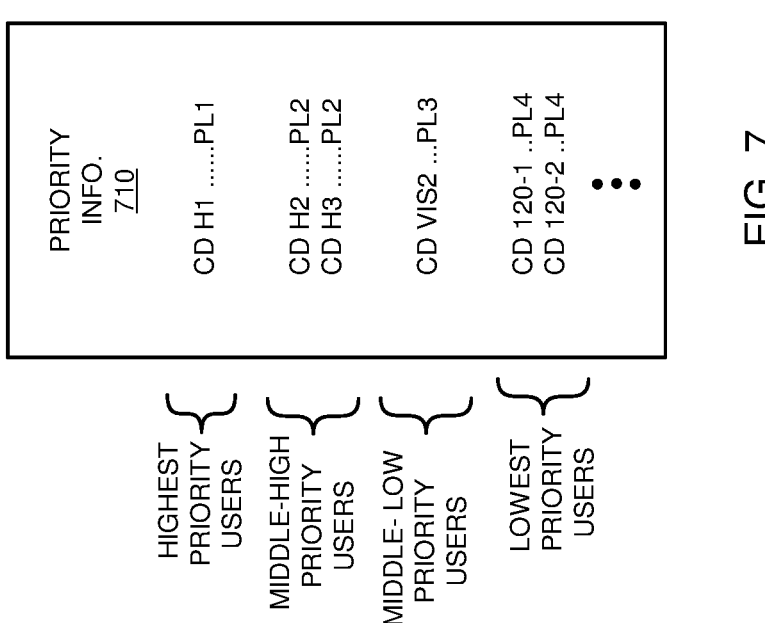
FIG. 7 is an example diagram illustrating different priority levels assigned to the different communication devices and corresponding conveyance of communications through a wireless access point as discussed herein.

FIG. 7 is an example diagram illustrating different priority levels assigned to the different communication devices and corresponding conveyance of communications through a wireless access point as discussed herein.

As shown in this example, each of the communication devices is assigned a respective priority level. For example, the communication device H1 is assigned the priority level PL1, which is the highest priority of communicating from the communication device H1 through the wireless access point 131 to the network 190. Each of the communication devices H2 and H3 are assigned a second priority level of PL2, which is the next highest priority of communicating data from the communication devices to the wireless access point 131 to the network 190. The communication device VIS2 is assigned a next priority level of PL3, which is the next highest priority of communicating data from the communication devices 2 and through the wireless access point 131 to the network 190.

As further shown, the communication device 120-1 associated with the corresponding vehicle V1 is assigned the lowest priority level PL4. The communication device 120-2 associated with the corresponding vehicle V2 is assigned the lowest priority level PL4.

Accordingly, the highest priority is PL1 while the lowest priority in this example is PL4.

According to the hierarchy of priority as indicated by the priority information 710, the wireless access point 131 is configured to provide wireless service and communication of corresponding data associated with the communication devices H1, H2, H3, etc., at higher bandwidth and lower delay latency than wireless service supporting communication of corresponding vehicle data associated with the communication devices 120-1 and 120-2. Note that a certain minimum amount of wireless bandwidth may be provided to the communication device 120-1 and the communication device 120-2 to ensure that the corresponding vehicles are able to communicate respective vehicle data through the wireless access point 131 to the remote network 190.

As further discussed herein, in accordance with the data flow control model 162 and corresponding schedule information 161, the communication management resource 131-1 or other suitable entity can be configured to adjust a priority of conveying communications through the wireless access point 131 to a destination network address (such as network address XYZA) in the remote network 190 depending on a time in which the first mobile communication device is expected to depart from the subscriber domain 151 serviced by the first wireless access point 131 as indicated by the schedule information 161.

Additionally, or alternatively, the communication management resource 131-1 or other suitable entity can be configured to adjust a priority of conveying communications through the wireless access point 131 to a destination network address (such as network address XYZA) in the remote network 190 depending on a time in which one or more communication devices are expected to arrive at the subscriber domain 151 serviced by the first wireless access point 131 as indicated by the schedule information 161.

Figure 8:
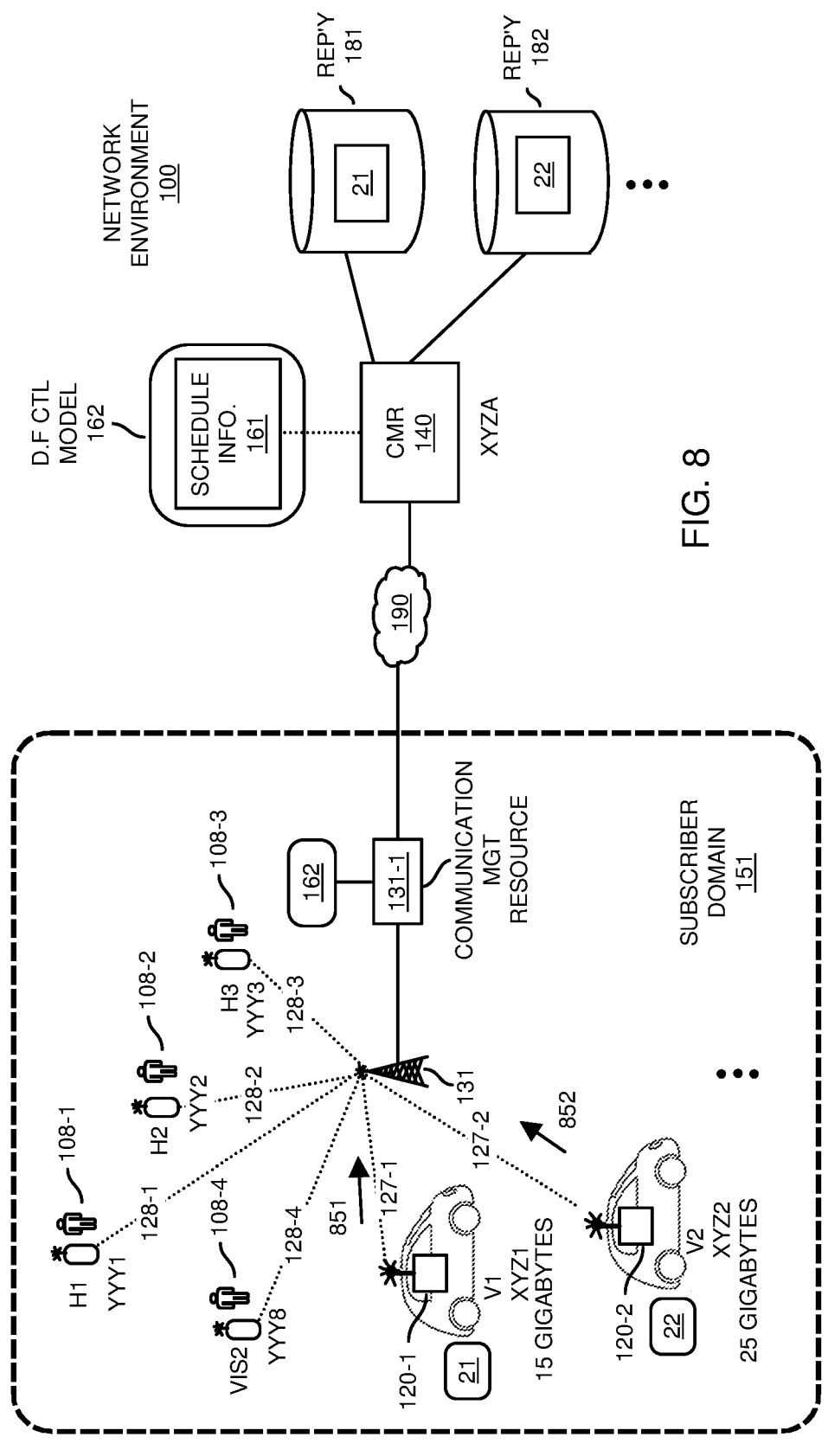
FIG. 8 is an example diagram illustrating implementation of data flow control using schedule information as discussed herein.

FIG. 8 is an example diagram illustrating implementation of data flow control using schedule information as discussed herein.

In this example, the communication management resource 131-1 associated with the wireless access point 131 receives data flow control model 162 and/or schedule information 161 indicating a pattern (see the pattern of uses indicated in FIG. 6) of multiple mobile communication devices associated with the subscriber domain 151 communicating through a wireless access point 131 to a remote network 190.

The communication management resource 131-1 and/or communication management resource 140 use the data flow control model 162 and/or corresponding schedule information 161 to control priority of conveying communications from the multiple mobile communication devices (such as the communication device H1, communication device H2, communication device H3, . . . , Communication device 121, and communication device 120-2) through the wireless access point 131 to the remote network.

For example, assume that the mobile communication device 120-1 has first buffered vehicle data 21 associated with vehicle V1 for transmission to a destination network address XYZA (such as communication management resource 140) in the remote network 190. Assume that first mobile communication device 120-2 has second buffered vehicle data 22 associated with vehicle V2 for transmission to a destination network address XYZA (such as communication management resource 140) in the remote network 190.

Assume further that the communication device 120-2 attempts to upload vehicle data 22 over the wireless communication link 127-1 with the wireless access point 131 at 5 a.m. on a Thursday. The communication management resource 131-1 or other suitable entity provides notification to the communication device 120-2 to communicate corresponding vehicle data 22 over the wireless communication link 127-1 through the wireless access point 131 to the communication management resource 140. Based on the amount of vehicle data 22 to be transmitted, this may take an hour of time to transmit the vehicle data 22 through the wireless access point 131 to the communication management resource 140.

Assume further that the communication device 120-1 associated with the vehicle V1 communicates a request at 5:01 am on the same Thursday as previously discussed to transmit corresponding vehicle data 21 through the wireless access point 131 to the communication management resource 140. Because the wireless access point 131 is able to provide only limited wireless bandwidth to all the communication device collectively, the communication management resource 131-1 or other suitable entity uses the schedule information 161 as a basis to most efficiently provide an upload of the respective vehicle data from communication device 120-1 and communication device 120-2 to the wireless access point 130 to the communication management resource 140.

More specifically, in this example, the communication management resource 131-1 associated with the wireless access point 131 determines from the schedule information 161 that the vehicle V1 is expected to depart from the subscriber domain 151 at 6 a.m. on that Thursday. Additionally, the communication management resource 131-1 associated with the wireless access point 131 determines from the schedule information that the vehicle V2 is expected in part from the subscriber domain 151 at 7 a.m. on that Thursday.

As shown in FIG. 7, and as previously discussed, the communication device 121-1 and the communication device 121-2 are initially assigned the same priority level. Assume that the wireless access point 131 does not have sufficient wireless bandwidth to support conveyance of both instances of the vehicle data 21 and vehicle data 22 between 5 a.m. and 6 a.m. through the wireless access point 131 to the remote network 190 corresponding communication management resource 140. In such an instance, based on the schedule information 161, and corresponding data flow control model 162, the communication management resource 131-1 adjusts a priority of the mobile communication device 120-1 to be higher in priority for transmitting vehicle data 21 to a destination network address XYZA than the second mobile communication device 120-2 communicating vehicle data 22 to the destination network address XYZA in response to detecting expected absence of the mobile communication device 120-1 from the subscriber domain at a time duration (such as between 6 a.m. and 7 a.m. as indicated by the schedule information 161.

In other words, even though both of the communication devices 120-1 and 120-2 attempt to simultaneously transmit the respective vehicle data through the wireless access point to a target destination in the network 190 and initially are assigned the same level priority PL4, the communication management resource 131-1 or other suitable entity changes the priority of communications such that the communication device 120-1 expected to depart from the subscriber domain 151 at 6 a.m. is given higher priority than the communication device 120-2 expected to depart from the subscriber domain 151 at 7 a.m.

In this example, the adjustment to the priority associated with communication device 120-1 and communication device 120-2 results in communication of the vehicle data 21 from the communication device 120-1 through the wireless access point 131 to the communication management resource 140 between 5 a.m. and 6 a.m. Additionally, because it is known that the communication device 120-2 will not depart the subscriber domain 151 until 7 a.m., the communication management resource 131-1 provides notification to the communication device 120-2 to communicate the respective vehicle data 22 through the wireless access point 131 between 6 a.m. and 7 a.m.

Accordingly, examples herein include controlling the priority of conveying the communications from the multiple mobile communication devices through the first wireless access point 131 to the remote network 190 and corresponding target destinations such as network address XYZA based on anticipated presence or absence of the multiple mobile communication devices in the subscriber domain 151 as indicated by the schedule information 161. More specifically, the schedule information 161 indicates the anticipated or expected arrival and departure times of the different communication devices into an out of the subscriber domain 151. Use of the schedule information 161 to control priority of communications from the multiple mobile communication devices is based on an anticipated time in which the multiple mobile communication devices 120-1 and 120-2 are expected to depart from the subscriber domain 151 serviced by the first wireless access point 131.

Additionally or alternatively, note that adjustment of the priority of the communication devices may be based upon the amount of respective vehicle data that is needed to be transmitted from each of the vehicles V1 and V2 through the wireless access point 131 to the communication management resource 140.

More specifically, as shown in FIG. 8, the vehicle V1 can be configured to generate 15 gigabytes of corresponding data for transmission to a communication management resource. The vehicle V2 can be configured to generate 25 gigabytes of corresponding data for transmission to a communication management resource.

In such an instance, the communication device 120-1 transmits communications 851 indicating attributes (such as vehicle data 21 includes 15 gigabytes) of corresponding vehicle data 21 available for uploading. The wireless access point 131 conveys the communications 851 received from the mobile communication device 120-1 through the wireless access point 131 to a destination network address such as associated with the communication management resource 131-1 and/or communication management resource 140. The communications 851 can be configured to specify a unique identity of the vehicle V1 associated with the communication device 120-1 and corresponding magnitude of first buffered data (such as 15 gigabytes) for transmission to the destination network address.

In a similar manner, the communication device 120-2 transmits communications 852 indicating attributes of corresponding vehicle data 22 available for uploading. The wireless access point 131 conveys the communications 852 received from the mobile communication device 120-2 through the wireless access point 131 to a destination network address such as associated with the communication management resource 131-1 and/or communication management resource 140. The communications 852 can be configured to specify a unique identity of the vehicle V2 associated with the communication device 120-2 and corresponding magnitude of first buffered data (such as 25 gigabytes) for transmission to the destination network address.

As previously discussed, the priority information 710 indicates that the communication device 120-1 and the communication device 120-2 are initially set to the same priority level PL4. The communication management resource implementing the data flow control model 162 adjusts a priority of the mobile communication device 120-2 to be higher in priority for transmitting vehicle data 22 to a destination network address (such as associated with communication management resource 140) than the mobile communication device 120-1 in response to detecting that the magnitude of vehicle data 22 buffered by the mobile communication device 120-2 for delivery to the destination network address is greater than a magnitude of vehicle data 21 buffered by the mobile communication device 120-1 for delivery to the destination network address. In other words, because 25 gigabytes associated with the vehicle data 22 is greater than 15 gigabytes associated with vehicle data 21, the communication management resource provides higher priority of communicating the data to the communication device 120-2.

As another example, the time arrival of respective vehicles into the subscriber domain 151 can be used as a basis in which to support priority communications associated with the vehicles V1 and V2. More specifically, it may be desirable for each of the vehicles and corresponding communication devices to transmit a continuous stream of data in a corresponding communication session through the wireless access point 131 to the communication management resource 140. At 4:55 pm on a Thursday, assume that the communication device 120-1 and corresponding vehicle V1 request a continuous 15 minute communication session of communicating respective data from the vehicle V1 through the wireless access point 131 to the communication management resource 140. Assume further that the communication management resource 131-1 knows that the vehicle V2 will require a communication session to transmit a continuous stream of data or communications in general through the wireless access point 131 to the communication management resource 140 at a time of arrival of the vehicle V2 in the subscriber domain 151 such as at 5 p.m. on Thursday.

In response to receiving the request for wireless bandwidth to support the continuous stream of data from the vehicle V1 corresponding communication device 120-1 through the wireless access point 131 to the communication management resource 140, the communication management resource 131-1 accesses the schedule information 161 to determine that the vehicle V2 is expected to arrive in the subscriber domain at 5 μm. In response to detecting the arrival time is 5 p.m., and that the vehicle V2 must use the wireless access point 131 upon arrival at 5 p.m., the communication management resource 131-1 delays the request for use of wireless services by the communication device 120-1 in favor of instead providing wireless services at 5 p.m. to the communication device 120-2 at 5 p.m. when it arrives in the subscriber domain 131. Accordingly, the time of arrival of the respective vehicle can be used as a basis in which to control priority of communications associated with the vehicles.

Figure 9:
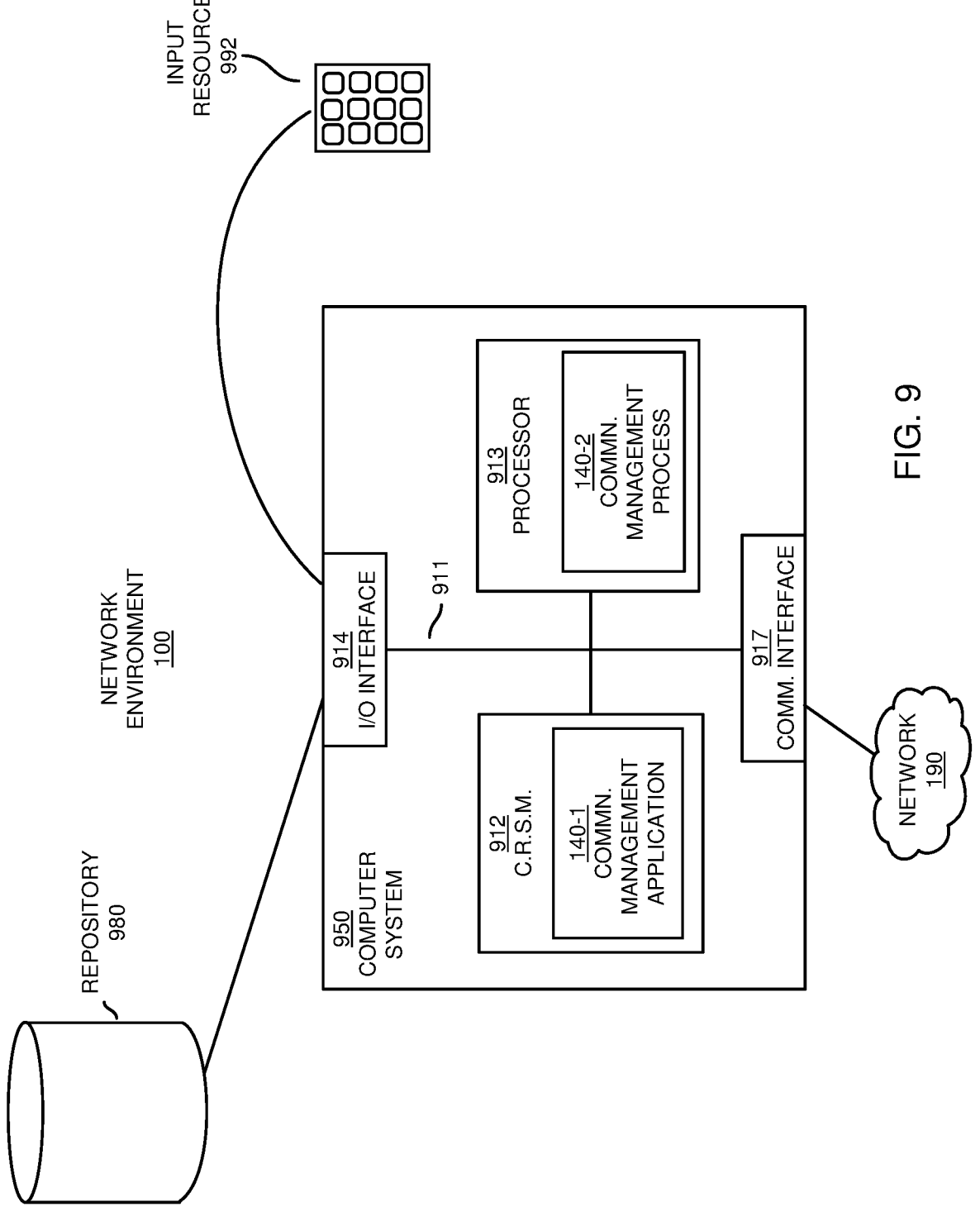
FIG. 9 is an example diagram illustrating example computer hardware and software operable to execute operations as discussed herein.

FIG. 9 is an example block diagram of a computer system for implementing any of the operations as previously discussed according to embodiments herein.

Note that any of the resources (such as communication management resource 131-1, communication management resource 140, communication device, vehicle, etc.) as discussed herein can be configured to include computer processor hardware and/or corresponding executable instructions to carry out the different operations as discussed herein.

For example, as shown, computer system 950 of the present example includes interconnect 911 coupling computer readable storage media 912 such as a non-transitory type of media or computer readable storage hardware (which can be any suitable type of resource in which digital information can be stored and or retrieved), a processor 913 (computer processor hardware), I/O interface 914, and a communications interface 917.

I/O interface(s) 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/ or data.

As shown, computer readable storage media 912 can be encoded with management application 140-1 in a respective wireless station to carry out any of the operations as discussed herein.

During operation of one embodiment, processor 913 accesses computer readable storage media 912 via the use of interconnect 911 in order to launch, run, execute, interpret or otherwise perform the instructions in management application 140-1 stored on computer readable storage medium 912. Execution of the management application 140-1 produces management process 140-2 to carry out any of the operations and/or processes as discussed herein.

Those skilled in the art will understand that the computer system 950 can include other processes and/or software and hardware components, such as an operating system that controls allocation and use of hardware resources to execute the management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 950 may reside at any location or can be included in any suitable resource in any network environment to implement functionality as discussed herein.

Functionality supported by the different resources will now be discussed via flowchart 1000 in FIG. 10. Note that the steps in the flowcharts below can be executed in any suitable order.

FIG. 10 is a flowchart 1000 illustrating an example method according to embodiments herein. Note that there will be some overlap with respect to concepts as discussed above.

In processing operation 1010, the communication management resource 140 and/or communication management resource 131-1 receives data flow control model 162 and corresponding schedule information 161 indicating a pattern of multiple mobile communication devices associated with a subscriber domain 151 communicating through a first wireless access point 131 to a remote network 190.

In processing operation 1020, the communication management resource 140 and/or communication management resource 131-1 utilizes the schedule information 161 to control priority of conveying communications from the multiple mobile communication devices through the first wireless access point 131 to the remote network 190.

Note again that techniques herein are well suited to facilitate wireless connectivity in accordance with different available wireless services. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this example has been particularly shown and described with references to preferred examples thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
receiving schedule information indicating a historical pattern of multiple mobile communication devices communicating through a first wireless access point associated with a subscriber domain to a remote network; and
utilizing the schedule information to control priority of conveying communications from the multiple mobile communication devices through the first wireless access point to the remote network.

2. The method as in claim 1, wherein the multiple mobile communication devices include a first mobile communication device and a second mobile communication device; and
wherein utilizing the schedule information includes:
adjusting a priority of the first mobile communication device to be higher in priority for transmitting data to a destination network address than the second mobile communication device in response to detecting expected absence of the first mobile communication device from the subscriber domain at a future time as indicated by the schedule information.

3. The method as in claim 1, wherein the multiple mobile communication devices include a first mobile communication device and a second mobile communication device, the method further comprising:
adjusting a priority of the first mobile communication device to be higher in priority for transmitting data to a destination network address than the second mobile communication device depending on: i) a magnitude of first data buffered by the first mobile communication device for delivery to the destination network address, and ii) a magnitude of second data buffered by the second mobile communication device for delivery to the destination network address.

4. The method as in claim 1 further comprising:
producing the schedule information based on monitored connectivity of the multiple mobile communication devices with the first wireless access point, the schedule information indicating a history of the multiple mobile communication devices wirelessly communicating through the first wireless access point to the remote network.

5. The method as in claim 1, wherein the multiple mobile communication devices include a first mobile communication device and a second mobile communication device, the method further comprising:
adjusting a priority of conveying data from the first mobile communication device through the first wireless access point to a destination network address in the remote network depending on a time in which the first mobile communication device is expected to depart from the subscriber domain as indicated by the schedule information.

6. The method as in claim 1 further comprising:
monitoring wireless connectivity of the multiple mobile communication devices with the first wireless access point, the monitored wireless connectivity indicating arrivals of the mobile communication devices to and departures of the mobile communication devices from the subscriber domain; and
deriving the schedule information based on the monitored wireless connectivity.

7. The method as in claim 6, wherein the multiple mobile communication devices include: i) a first mobile communication device operative to communicate first buffered data generated by a first vehicle to a destination network address in the remote network, and ii) a second mobile communication device operative to communicate second buffered data generated by a second vehicle to the destination network address in the remote network.

8. The method as in claim 1, wherein utilizing the schedule information to control priority of communications from the multiple mobile communication devices is based on respective anticipated times in which the multiple mobile communication devices are expected to depart from the subscriber domain serviced by the first wireless access point.

9. The method as in claim 1 further comprising:
conveying a first communication received from a first mobile communication device through the first wireless access point to a destination network address, the first communication specifying a unique identity of a first vehicle associated with the first communication device and corresponding magnitude of first buffered data for transmission to the destination network address; and
conveying a second communication received from the destination network address through the first wireless access point to the first mobile communication device, the second communication specifying a time at which to communicate the first buffered data through the first wireless access point to the destination network address.

10. The method as in claim 1, wherein utilizing the schedule information to control the priority includes:

controlling the priority of conveying the communications from the multiple mobile communication devices through the first wireless access point to the remote network based on anticipated presence of the multiple mobile communication devices in the subscriber domain as indicated by the schedule information.

11. The method as in claim 1, wherein the schedule information indicates times of day when each of the multiple mobile communication devices is anticipated to be present in the subscriber domain.

12. The method as in claim 1, wherein the schedule information indicates times of day when each of the multiple mobile communication devices is anticipated to be absent from the subscriber domain.

13. The method as in claim 1, wherein the multiple mobile communication devices include a first mobile communication device and a second mobile communication device operated in the subscriber domain to communicate with the first wireless access point;

wherein the historical pattern indicates that the first mobile communication device was previously detected as being present in the subscriber domain in a first time range; and wherein the historical pattern indicates that the second mobile communication device was previously detected as being present in the subscriber domain in a second time range.

14. The method as in claim 1, wherein the schedule information indicates times of day for each of multiple days when a first mobile communication device of the multiple mobile communication devices is anticipated to be absent from the subscriber domain.

15. The method as in claim 1, wherein the multiple mobile communication devices include the first mobile communication device; and wherein utilizing the schedule information to control the priority of conveying the communications includes: increasing a priority level of a first mobile communication device communicating through the first wireless access point to support completion of conveyance of transmitting buffered data from the first mobile communication device through the first wireless access point to the remote network prior to anticipated absence of the first mobile communication device from the subscriber domain as indicated by the schedule information.

16. A system comprising:

management hardware operative to:

receive schedule information indicating a historical pattern of multiple mobile communication devices communicating through a first wireless access point associated with a subscriber domain to a remote network; and utilize the schedule information to control priority of conveying communications from the multiple mobile communication devices through the first wireless access point to a destination network address in the remote network.

17. The system as in claim 16, wherein the multiple mobile communication devices include a first mobile communication device and a second mobile communication device; and wherein the management hardware is further operative to: adjust a priority of the first mobile communication device to be higher in priority for transmitting data to a destination network address than the second mobile communication device in response to detecting expected absence of the first mobile communication device from the subscriber domain at a time as indicated by the schedule information.

18. The system as in claim 16, wherein the multiple mobile communication devices include a first mobile communication device and a second mobile communication device; and wherein the management hardware is further operative to: adjust a priority of the first mobile communication device to be higher in priority for transmitting data to a destination network address than the second mobile communication device depending on: i) a magnitude of first data buffered by the first mobile communication device for delivery to the destination network address, and ii) a magnitude of second data buffered by the second mobile communication device for delivery to the destination network address.

19. The system as in claim 16, wherein the management hardware is further operative to:

produce the schedule information based on a monitored connectivity of the multiple mobile communication devices with the first wireless access point, the schedule information indicating a history of the multiple mobile communication devices wirelessly communicating through the first wireless access point to the remote network.

20. The system as in claim 16, wherein the multiple mobile communication devices include a first mobile communication device and a second mobile communication device; and wherein the management hardware is further operative to: adjust a priority of conveying data from the first mobile communication device through the first wireless access point to a destination network address in the remote network depending on a time in which the first mobile communication device is expected to depart from the subscriber domain as indicated by the schedule information.

21. The system as in claim 16, wherein the management hardware is further operative to:

monitor wireless connectivity of the multiple mobile communication devices with the first wireless access point, the monitored wireless connectivity indicating arrivals of the mobile communication devices to and departures of the mobile communication devices from the subscriber domain; and derive the schedule information based on the monitored wireless connectivity.

22. The system as in claim 21, wherein the multiple mobile communication devices include: i) a first mobile communication device operative to communicate first buffered data generated by a first vehicle to a destination network address in the remote network, and ii) a second mobile communication device operative to communicate second buffered data generated by a second vehicle to the destination network address in the remote network.

23. The system as in claim 16, wherein use of the schedule information to control priority of communications from the multiple mobile communication devices is based on respective anticipated times in which the multiple mobile communication devices are expected to depart from the subscriber domain serviced by the first wireless access point.

24. The system as in claim 16, wherein the management hardware is further operative to:

convey a first communication received from a first mobile communication device through the first wireless access point to a destination network address, the first communication specifying a unique identity of a first vehicle associated with the first communication device and corresponding magnitude of first buffered data for transmission to the destination network address; and convey a second communication received from the destination network address through the first wireless access point to the first mobile communication device, the second communication specifying a time at which to communicate the first buffered data through the first wireless access point to the destination network address.

25. The system as in claim 16, wherein the management hardware is further operative to:

control the priority of conveying the communications from the multiple mobile communication devices through the first wireless access point to the remote network based on anticipated presence of the multiple mobile communication devices in the subscriber domain as indicated by the schedule information.

26. Computer-readable storage hardware having instructions stored thereon, the instructions, when carried out by computer processor hardware, cause the computer processor hardware to:

receive schedule information indicating a historical pattern of multiple mobile communication devices communicating through a first wireless access point associated with a subscriber domain to a remote network; and utilize the schedule information to control priority of conveying communications from the multiple mobile communication devices through the first wireless access point to a destination network address in the remote network.

* * * * *